United States Patent
Guan et al.

(10) Patent No.: US 11,261,287 B2
(45) Date of Patent: Mar. 1, 2022

(54) COMPOSITION CAPABLE OF SUBSTITUTING USE OF STYRENE-ACRYLONITRILE COPOLYMER POP

(71) Applicants: JIAHUA SCIENCE & TECHNOLOGY DEVELOPMENT (SHANGHAI) LTD., Shanghai (CN); JIAHUA CHEMICALS INC., Liaoning (CN)

(72) Inventors: Yongjian Guan, Shanghai (CN); Baoning Song, Shanghai (CN); Yubo Li, Shanghai (CN)

(73) Assignees: Jiahua Science & Technology Development (Shanghai) Ltd., Shanghai (CN); Jiahua Chemicals Inc., Liaoning (CN)

( * ) Notice: Subject to any disclaimer, the term of this patent is extended or adjusted under 35 U.S.C. 154(b) by 188 days.

(21) Appl. No.: 16/316,654

(22) PCT Filed: Jul. 11, 2017

(86) PCT No.: PCT/CN2017/092450
§ 371 (c)(1),
(2) Date: Jan. 10, 2019

(87) PCT Pub. No.: WO2018/010630
PCT Pub. Date: Jan. 18, 2018

(65) Prior Publication Data
US 2019/0292301 A1    Sep. 26, 2019

(30) Foreign Application Priority Data

Jul. 12, 2016 (CN) .......................... 201610546052.8

(51) Int. Cl.
| | | |
|---|---|---|
| *C08G 18/48* | (2006.01) | |
| *C08F 283/06* | (2006.01) | |
| *C08G 18/63* | (2006.01) | |
| *C08G 18/76* | (2006.01) | |
| *C08G 65/26* | (2006.01) | |
| *C08J 9/14* | (2006.01) | |
| *C08G 18/66* | (2006.01) | |
| *C08G 18/32* | (2006.01) | |
| *C08F 220/44* | (2006.01) | |
| *C08L 71/02* | (2006.01) | |
| *C08L 51/08* | (2006.01) | |
| *C08G 101/00* | (2006.01) | |

(52) U.S. Cl.
CPC ........ *C08G 18/4829* (2013.01); *C08F 220/44* (2013.01); *C08F 283/06* (2013.01); *C08G 18/3206* (2013.01); *C08G 18/3275* (2013.01); *C08G 18/485* (2013.01); *C08G 18/632* (2013.01); *C08G 18/6688* (2013.01); *C08G 18/7621* (2013.01); *C08G 18/7664* (2013.01); *C08G 65/2609* (2013.01); *C08J 9/14* (2013.01); *C08J 9/146* (2013.01); *C08L 51/08* (2013.01); *C08L 71/02* (2013.01); *C08G 2101/00* (2013.01); *C08J 2203/142* (2013.01); *C08J 2375/04* (2013.01)

(58) Field of Classification Search
CPC ............ C08G 18/4829; C08G 18/4816; C08G 18/4812; C08F 283/06
See application file for complete search history.

(56) References Cited

U.S. PATENT DOCUMENTS

| | | | | |
|---|---|---|---|---|
| 4,727,094 A | * | 2/1988 | Hoy ....................... | C08G 18/48 521/164 |
| 2010/0261804 A1 | * | 10/2010 | Yamanaka ......... | C08G 18/4244 521/137 |
| 2013/0203880 A1 | | 8/2013 | George et al. | |

FOREIGN PATENT DOCUMENTS

| | | |
|---|---|---|
| CN | 1228446 A | 9/1999 |
| CN | 1730554 A | 2/2006 |
| CN | 101096406 A | 1/2008 |
| CN | 101845218 A | 9/2010 |
| CN | 101945218 A | 1/2011 |
| CN | 104045807 A | 9/2014 |
| CN | 104193934 A | 12/2014 |

(Continued)

OTHER PUBLICATIONS

Translation of JP 2001-342236 (2001) (Year: 2001).*

(Continued)

*Primary Examiner* — Robert C Boyle
(74) *Attorney, Agent, or Firm* — Miles & Stockbridge P.C.; Ajay A. Jagtiani

(57) ABSTRACT

A composition capable of substituting the use of styrene-acrylonitrile copolymer POP, comprising polyether polyol A having a hydroxyl value of 100-1000 mgKOH/g and a functionality of 4-8, and a polymer polyol having a hydroxyl value of 12-100 mgKOH/g, a functionality of 2-4, and a solid content of 4-45%, the branches thereof not containing polystyrene units. The polyurethane foam produced using the present composition to substitute the use of traditional styrene-acrylonitrile copolymer POP avoids the problem of styrene volatilisation due to the absence of styrene, and the produced polyurethane foam also maintains equivalent or even superior physical properties compared to the polyurethane foam made from styrene-acrylonitrile copolymer POP in the prior art; thus, the present compound is fully capable of substituting traditional styrene-acrylonitrile copolymer POP for the production of environmentally friendly, high rebound, and block-shaped soft polyurethane foam materials.

14 Claims, No Drawings

(56) References Cited

FOREIGN PATENT DOCUMENTS

| CN | 104321360 A | | 1/2015 |
|---|---|---|---|
| CN | 105153390 A | | 12/2015 |
| CN | 105440243 A | | 3/2016 |
| CN | 105968269 A | | 9/2016 |
| CN | 101845218 A | | 9/2019 |
| EP | 1826223 A1 | | 8/2007 |
| JP | 2001-342236 | * | 12/2001 |
| JP | 2001342236 A | | 12/2001 |

OTHER PUBLICATIONS

International Search Report of PCT/CN2017/092450 dated Sep. 27, 2017.
Supplementary European Search Report of Application No. EP 17 82 6966 dated Jun. 17, 2019.
Plastic Industry Manual Polyurethane, Li Junxian, editor.
Resin and Plastic "Chemical Encyclopedia", Professional Volume, Part I, Chemical Industry Press, 2002.
Polyurethane Raw Materials and Agent Manual, Second Edition, Chemical Industry Press, 2012.
Synthetic Resin and Plastics Manual, First Edition, Chemical Industry Press, Nov. 1991.
Polyurethane Elastomers Manual, Shanxi Institute of Chemical Industry, Chemical Industry Press, 2001.
Chinese Application No. 2016105460528, First Office Action dated Nov. 16, 2017.
Chinese Application No. 2016105460528, Second Office Action dated Jun. 14, 2018.
First Office Action issued in EP Application No. 17 826 966.8 dated Jul. 15, 2019.
EPO Communication pursuant to Article 94(3) EPC from counterpart European Patent Application No. 17 826 966.8, dated Jan. 27, 2020.
Substantive First Examination Report issued in related Saudi Patent Application No. 519400850 dated Jul. 14, 2021.

* cited by examiner

COMPOSITION CAPABLE OF SUBSTITUTING USE OF STYRENE-ACRYLONITRILE COPOLYMER POP

CROSS REFERENCE TO RELATED APPLICATIONS

This application claims the benefit of the filing date of Chinese Patent Application No. 201610546052.8 filed on Jul. 12, 2016, with the title of "a composition capable of substituting use of styrene-acrylonrile copolymer POP", the entire disclosure of which is incorporated by reference herein.

TECHNICAL FIELD

The present invention relates to the field of polyurethane materials, and more particularly to a composition capable of substituting use of styrene-acrylonrile copolymer POP.

BACKGROUND

Polyurethane foam has been widely concerned with its excellent performance and convenient and rapid molding process, and has made a substantial development. Especially in recent years, with the popularization of transportation vehicles such as automobiles, the demand of polyurethane foam in automotive interior parts such as seats, seat cushions, sun visors, and shock-proof sound insulation layers is also significantly increased. At the same time, in industries such as furniture, polyurethane foam is more and more widely used due to its good comfort and adjustable density.

In order to enhance the mechanical strength and load-bearing properties of polyurethane products, the current common solution for manufacturers is to add an organic petrochemical raw material called polymer polyol (POP) to the formulation. However, since POP belongs to petrochemical products, its cost is relatively high, and the average market price in recent years is 15-16 RMB/Kg. More importantly, POP is produced by graft copolymerization of acrylonitrile and styrene in the presence of a free radical initiator, which involves using basic polyether polyol as a masterbatch. The residual styrene will cause POP to release a strong irritating odor and harmful gas. As a result, the polyurethane products fail to meet the national environmental protection requirements on the limit of volatile organic compounds in the passenger car. In China, volatile organic compounds (VOC) refer to organic compounds with a saturated vapor pressure of more than 70 Pa at normal temperature and a boiling point of 260° C. or less at atmospheric pressure. They exist in the form of evaporation in the air, and their toxicity, irritability, carcinogenicity and special odors can affect the skin and mucous tissues, causing acute damage to the human body. VOC testing and air quality for automobiles and furniture mainly includes determining the volatilization amount of eight substances such as formaldehyde, acetaldehyde, acrolein, toluene, ethylbenzene, xylene, styrene and benzene, among which styrene is mainly introduced by POP. Therefore, it has become a main direction of research in the industry to find a raw material that can replace POP while reduce the VOC content in foam products.

In prior arts, Chinese patent application document CN104193934A discloses a preparation method of polymer polyol used for environmentally friendly polyurethane slabstock foam, which adopts a chemical polycondensation method comprising: firstly methylolating some of melamine to form a polycondensation core, and then dispersing or locally grafting the polycondensation core into a tri-hydroxy polyether polyol having a functional group of 2 or more, a hydroxyl value equivalent of 1000 and a molecular weight of 3000 to obtain a mixture, and finally reacting the mixture with urea, formaldehyde, and remaining melamine to produce the final polymer polyols. The above-mentioned technology utilizes melamine and urea to substitute the use of styrene and acrylonitrile to obtain polymer polyols not containing styrene, so that the polyurethane foam produced therefrom has no toxic effects on the human body. However, the above-mentioned technology has a long process route and is complicated to operate, which is only suitable for the preparation of block shaped soft foam, but not suitable for high rebound soft foam. Therefore, the polymer polyols prepared by this technology have the disadvantages of high production cost and poor universality, and it is difficult to truly replace the use of traditional styrene-acrylonitrile copolymer POP.

SUMMARY OF THE INVENTION

The present invention is designed to overcome the defects of large styrene volatilization and high toxicity of the existing styrene-acrylonitrile copolymer POP, and further to provide a composition capable of substituting use of styrene-acrylonrile copolymer POP.

For this purpose, the above-mentioned object of the present invention is achieved by the following technical solutions:

In one aspect, the present invention provides a composition capable of substituting use of styrene-acrylonrile copolymer POP, comprising:
  polyether polyol A having a hydroxyl value of 100 to 1000 mg KOH/g and a functionality of 4 to 8; and
  polymer polyol having a hydroxyl value of 12-100 mg KOH/g, a functionality of 2 to 4, and a solid content of 5 to 45%; the branches thereof not containing polystyrene units.

Preferably, the polyether polyol A has a hydroxyl value of 300 to 600 mg KOH/g.

Preferably, the polymer polyol has a hydroxyl value of 15 to 35 mg KOH/g, a functionality of 2 to 3, and a solid content of 10 to 30%.

Preferably, a mass ratio of the polyether polyol A to the polymer polyol is (1 to 20):(80 to 99).

Preferably, a mass ratio of the polyether polyol A to the polymer polyol is (1 to 8):(92 to 99).

Preferably, the polyether polyol A is prepared by polymerization of a polyhydroxy compound and an epoxy compound. The epoxy compound is selected from a group consisting of ethylene oxide, propylene oxide, butylene oxide or any mixture thereof.

Preferably, the polymer polyol is prepared by graft-polymerization of polyether polyol B and acrylonitrile, and the polyether polyol B is prepared by copolymerization of glycerol, ethylene oxide and propylene oxide.

Preferably, the polymer polyol comprises propylene oxide repeating units in an amount of 50-90 wt %, and ethylene oxide end-capped ratio is 50~80%.

In another aspect, the present invention provides a use of the abovementioned composition in the preparation of polyurethane materials.

Preferably, the composition is used to substituent styrene-acrylonitrile copolymer POP in the raw material formulation for preparing polyurethane.

In the present invention, the term "styrene-acrylonitrile copolymer POP" means a polymer polyol formed by free radical grafting polymerization of a base polyether polyol with styrene and acrylonitrile. The term "solid content", also known as grafting density, refers to the proportion of the mass of the grafted portion of the polymer polyol to the total mass of the polymer polyol.

The technical solution of the present invention has the following advantages:

According to the present invention, it is the first time to propose to substitute the use of conventional styrene-acrylonitrile copolymer POP with a combination of a polyether polyol A having a hydroxyl value of 100 to 1000 mgKOH/g and a functionality of 4 to 8 and polymer polyol having a hydroxyl value of 12-100 mg KOH/g, a functionality of 2 to 4, and a solid content of 5 to 45%; the branches thereof not containing polystyrene units. In this way, the produced polyurethane foam does not contain styrene, so there is no styrene volatilisation. The polyurethane foam produced using the present composition can also maintain equivalent or even superior physical properties compared to the polyurethane foam made from styrene-acrylonitrile copolymer POP in the prior art. Thus, the present compound is fully capable of substituting traditional styrene-acrylonitrile copolymer POP for the production of environmentally friendly, high rebound, and block-shaped soft polyurethane foam materials.

Further, the addition of propylene oxide contributes to lowering the crystallinity and melting point of the polyether polyols, making it easier to use. In addition, high ethylene oxide capping ratio is beneficial to improve the reactivity of the composition system. Therefore, the composition of the present invention further defines that the polymer polyol comprises propylene oxide repeating units in an amount of 50-90 wt %, and ethylene oxide end-capped ratio is 50-80%, which ensure that the composition of the present invention is suitable for cold molding to produce high resilience foam, which improves the production efficiency of the foam.

DETAILED DESCRIPTION OF EMBODIMENTS

In order to make the contents of the present invention more easily to understand, the present invention is further described in detail with reference to specific embodiments. Apparently, the aforementioned embodiments are merely parts of the embodiments but not all. Any embodiments obtained without creative labor by the person skilled in the art are embraced within the protection scope of the present invention. In addition, the technical features described in different embodiments of the present invention described below may be recombined with each other as long as they do not form a conflict with each other.

Embodiment 1

The composition capable of substituting the use of styrene-acrylonitrile copolymer POP according to the present embodiment is a mixture of polyether polyol A and polymer polyol having no polystyrene unit in the branches at a mass ratio of 1:99, wherein:

The polyether polyol A having a hydroxyl value of 380 mg KOH/g and a functionality of 6 is prepared by polymerization of glycerol, sucrose and propylene oxide.

The polymer polyol has a hydroxyl value of 35 mg KOH/g, a functionality of 3, and a solid content of 15%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 75 wt %, and the ethylene oxide end-capped ratio is 80%.

Embodiment 2

The composition capable of substituting the use of styrene-acrylonitrile copolymer POP according to the present embodiment is a mixture of polyether polyol A and polymer polyol having no polystyrene unit in the branches at a mass ratio of 20:80, wherein:

The polyether polyol A having a hydroxyl value of 600 mg KOH/g and a functionality of 4 is prepared by polymerization of pentaerythritol and propylene oxide.

The polymer polyol has a hydroxyl value of 12 mg KOH/g, a functionality of 3, and a solid content of 45%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 70 wt %, and the ethylene oxide end-capped ratio is 50%.

Embodiment 3

The composition capable of substituting the use of styrene-acrylonitrile copolymer POP according to the present embodiment is a mixture of polyether polyol A and polymer polyol having no polystyrene unit in the branches at a mass ratio of 10:90, wherein:

The polyether polyol A having a hydroxyl value of 450 mg KOH/g and a functionality of 5 is prepared by polymerization of Sorbitol, glycerol and propylene oxide.

The polymer polyol has a hydroxyl value of 25 mg KOH/g, a functionality of 2, and a solid content of 27.5%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 90 wt %, and the ethylene oxide end-capped ratio is 65%.

Embodiment 4

The composition according to the present embodiment is a mixture of polyether polyol A and polymer polyol having no polystyrene unit in the branches at a mass ratio of 5:95, wherein:

The polyether polyol A having a hydroxyl value of 100 mg KOH/g and a functionality of 8 is prepared by polymerization of ethylene glycol, sucrose and propylene oxide.

The polymer polyol has a hydroxyl value of 20 mg KOH/g, a functionality of 3, and a solid content of 20%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 80 wt %, and the ethylene oxide end-capped ratio is 60%.

Embodiment 5

The composition capable of substituting the use of styrene-acrylonitrile copolymer POP according to the present embodiment is a mixture of polyether polyol A and polymer polyol having no polystyrene unit in the branches at a mass ratio of 15:85, wherein:

The polyether polyol A having a hydroxyl value of 350 mg KOH/g and a functionality of 5 is prepared by polymerization of Sorbitol and propylene oxide.

The polymer polyol has a hydroxyl value of 30 mg KOH/g, a functionality of 3, and a solid content of 35%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 65 wt %, and the ethylene oxide end-capped ratio is 75%.

Embodiment 6

The composition capable of substituting the use of styrene-acrylonitrile copolymer POP according to the present embodiment is a mixture of polyether polyol A and polymer polyol having no polystyrene unit in the branches at a mass ratio of 8:92, wherein:

The polyether polyol A having a hydroxyl value of 500 mg KOH/g and a functionality of 4 is prepared by polymerization of glycerol, Sorbitol and ethylene oxide.

The polymer polyol has a hydroxyl value of 15 mg KOH/g, a functionality of 2, and a solid content of 10%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 50 wt %, and the ethylene oxide end-capped ratio is 70%.

Embodiment 7

The composition capable of substituting the use of styrene-acrylonitrile copolymer POP according to the present embodiment is a mixture of polyether polyol A and polymer polyol having no polystyrene unit in the branches at a mass ratio of 6:94, wherein:

The polyether polyol A having a hydroxyl value of 1000 mg KOH/g and a functionality of 7 is prepared by polymerization of glycerol, sucrose and epoxy butane.

The polymer polyol has a hydroxyl value of 100 mg KOH/g, a functionality of 4, and a solid content of 5%. The polymer polyol is prepared by graft-polymerization of polyether polyol B and acrylonitrile, and the polyether polyol B is prepared by copolymerization of glycerol, ethylene oxide and propylene oxide. Further, in the molecular structure of the polymer polyol, propylene oxide repeating units account for 85 wt %, and the ethylene oxide end-capped ratio is 80%.

Embodiment 8

Polyurethane high rebound foam is prepared by using the composition of Embodiment 1 of the present invention as one of the raw materials. In detail, the polyurethane high rebound foam is prepared from component M and component N with a mass ratio M:N=1:0.44. Wherein, the component M is composed of: 100 parts by weight of the composition of Embodiment 1, 0.5 parts by weight of chain extender DEG, 1 part by weight of cross-linking agent DEOA, 4 parts by weight of opening agent DK-12, 0.6 parts by weight of foam stabilizer DC6070, 3.5 parts by weight of water, 2 parts by weight of foaming agent HCFC-141B, 0.06 parts by weight of tertiary amine catalyst A-1, 0.3 parts by weight of A-33, 0.2 parts by weight of C-225; and the component N is an mixture of isocyanates: 80 parts by weight of TDI (80/20), and 20 parts by weight of PM-200.

Embodiment 9

Polyurethane high rebound foam is prepared under the same conditions of Embodiment 8, except that "the composition of Embodiment 1" in the above Embodiment 8 is replaced with the composition of Embodiment 6 of the present invention.

Comparative Example 1

Polyurethane high rebound foam is prepared under the same conditions of Embodiment 8, except that "the composition of Embodiment 1" in the above Embodiment 8 is replaced with styrene-acrylonitrile copolymer POP. In the present comparative example, a base polyether polyols required for the preparation of styrene-acrylonitrile copolymer POP is prepared by copolymerization of glycerol, ethylene oxide and propylene oxide.

Experimental Example

The mechanical strengths of the polyurethane high rebound foam materials prepared in Embodiments 8-9 and Comparative Example 1 of the present invention are tested, and the results are shown in Table 1.

TABLE 1

Mechanical strength of polyurethane high rebound foam materials

| | Embodiment 8 | Embodiment 9 | Comparative Example 1 | Testing Standard |
|---|---|---|---|---|
| Tensile strength (MPa) | 0.12 | 0.11 | 0.08 | GB/T 6344 |
| Tear strength (kN/m) | 0.3 | 0.3 | 0.2 | GB 10808-89 |
| Indentation strength (N) | 26.4 | 28.2 | 26.5 | GB/T 10807 |
| Elongation at break (%) | 180 | 185 | 150 | GB/T 6344 |
| Resilience test (%) | 65 | 66 | 63 | GB/T 6670 |

As can be seen from Table 1, the polyurethane high rebound foams prepared in Embodiments 8-9 have better physical and mechanical properties than that of Comparative Example 1, which fully demonstrates that the polyurethane foams prepared by the composition having the specific compositions of the present invention can eliminate styrene content in the foam without reducing the physical and mechanical properties of the foam, so that the composition of the present invention can be used to substitute traditional styrene-acrylonitrile copolymer POP to prepare environmentally friendly polyurethane foam material.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A composition capable of substituting the use of styrene-acrylonitrile copolymer POP, characterized in that the composition comprises:
   a polyether polyol A having a hydroxyl value of 100 to 1000 mg KOH/g and a functionality of 4 to 8; and
   a polymer polyol having a hydroxyl value of 12-100 mg KOH/g, a functionality of 2 to 4, and a solid content of 5 to 45%; branches thereof not containing polystyrene units;
   wherein the polymer polyol is prepared by graft-polymerization of a polyether polyol B and acrylonitrile and thus comprises a grafted portion, and the polyether polyol B is prepared by copolymerization of glycerol, ethylene oxide and propylene oxide;
   wherein the solid content refers to the proportion of the mass of the grafted portion of the polymer polyol to the total mass of the polymer polyol,
   wherein the polymer polyol comprises propylene oxide repeating units in an amount of 75 wt %.

2. The composition according to claim 1, characterized in that the polyether polyol A has a hydroxyl value of 300 to 600 mg KOH/g.

3. The composition according to claim 1, characterized in that the polymer polyol has a hydroxyl value of 15 to 35 mg KOH/g, a functionality of 2 to 3, and a solid content of 10 to 30%.

4. The composition according to claim 1, characterized in that a mass ratio of the polyether polyol A to the polymer polyol is (1 to 20):(80 to 99).

5. The composition according to claim 1, characterized in that a mass ratio of the polyether polyol A to the polymer polyol is (1 to 8):(92 to 99).

6. The composition according to claim 1, characterized in that the polyether polyol A is prepared by polymerization of a polyhydroxy compound and an epoxy compound, and the epoxy compound is selected from a group consisting of ethylene oxide, propylene oxide, butylene oxide or any mixture thereof.

7. The composition according to claim 2, characterized in that the polymer polyol has a hydroxyl value of 15 to 35 mg KOH/g, a functionality of 2 to 3, and a solid content of 10 to 30%.

8. The composition according to claim 2, characterized in that a mass ratio of the polyether polyol A to the polymer polyol is (1 to 20):(80 to 99).

9. The composition according to claim 3, characterized in that a mass ratio of the polyether polyol A to the polymer polyol is (1 to 20):(80 to 99).

10. The composition according to claim 2, characterized in that a mass ratio of the polyether polyol A to the polymer polyol is (1 to 8):(92 to 99).

11. The composition according to claim 3, characterized in that a mass ratio of the polyether polyol A to the polymer polyol is (1 to 8):(92 to 99).

12. The composition according to claim 4, characterized in that a mass ratio of the polyether polyol A to the polymer polyol is (1 to 8):(92 to 99).

13. The composition according to claim 2, characterized in that the polyether polyol A is prepared by polymerization of a polyhydroxy compound and an epoxy compound, and the epoxy compound is selected from a group consisting of ethylene oxide, propylene oxide, butylene oxide or any mixture thereof.

14. The composition according to claim 3, characterized in that the polyether polyol A is prepared by polymerization of a polyhydroxy compound and an epoxy compound, and the epoxy compound is selected from a group consisting of ethylene oxide, propylene oxide, butylene oxide or any mixture thereof.

* * * * *